(12) United States Patent
Hori et al.

(10) Patent No.: US 7,063,194 B2
(45) Date of Patent: Jun. 20, 2006

(54) ROTATION TRANSMISSION DEVICE

(75) Inventors: Isao Hori, Shizuoka (JP); Tatsuya Yamasaki, Shizuoka (JP); Koichi Okada, Shizuoka (JP); Yoshitaka Nagano, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/174,653

(22) Filed: Jul. 6, 2005

(65) Prior Publication Data
US 2005/0241904 A1    Nov. 3, 2005

Related U.S. Application Data

(62) Division of application No. 10/609,482, filed on Dec. 16, 2003, now abandoned.

(30) Foreign Application Priority Data

Jul. 2, 2002  (JP)  ............... 2002-193609
Aug. 29, 2002 (JP)  ............... 2002-250271

(51) Int. Cl.
F16D 41/067 (2006.01)
F16D 27/10  (2006.01)
B60K 23/08  (2006.01)

(52) U.S. Cl. ....................... 192/35; 192/84.8
(58) Field of Classification Search ..................... None
See application file for complete search history.

(56) References Cited

U.S. PATENT DOCUMENTS

| | | |
|---|---|---|
| 2,081,605 A | 5/1937 | Sinclair |
| 4,809,833 A | 3/1989 | Brunken et al. |
| 4,880,281 A | 11/1989 | Merkelbach |
| 5,485,905 A | 1/1996 | Rader, III |
| 6,093,478 A | 7/2000 | Jasinetzky et al. |
| 6,244,403 B1* | 6/2001 | Ito et al. .................. 192/35 |
| 6,257,386 B1* | 7/2001 | Saito et al. ............... 192/38 |
| 6,491,440 B1 | 12/2002 | Sahashi et al. |
| 6,766,888 B1* | 7/2004 | Yasui et al. ............... 192/35 |

* cited by examiner

Primary Examiner—Rodney H. Bonck
(74) Attorney, Agent, or Firm—Wenderoth, Lind & Ponack, L.L.P.

(57) ABSTRACT

A rotation transmission device has a two-way clutch prevented from engaging while the inner member is rotating unengaged with the outer member. The clutch includes an outer member, a cam ring mounted in the outer member, rollers each mounted between a cylindrical surface of the outer member and a cam surface of the cam ring, and a roller retainer. The device further comprises a rotor mounted between the solenoid and retainer so as to be nonrotatable relative to the outer ring, an armature nonrotatable relative to the retainer and axially movable, a spring axially biasing the armature away from the rotor, and an engaging plate nonrotatable relative to the inner member and axially immovable. The armature and engaging plate engage together when the armature rotates in one direction by a predetermined angle relative to the engaging plate. A high-strength clutch outer ring is mounted in the outer ring.

3 Claims, 19 Drawing Sheets

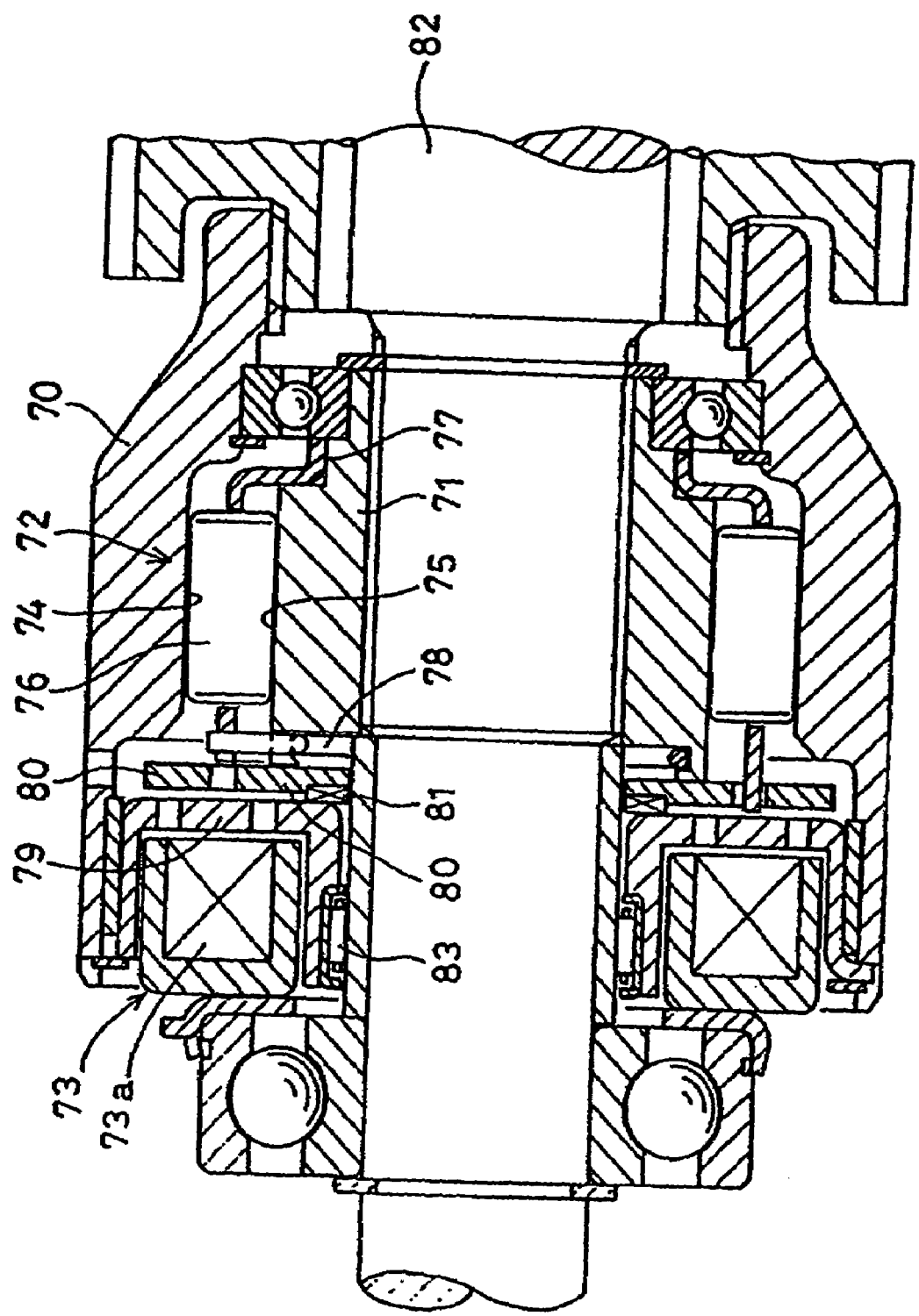
FIG. 18 - PRIOR ART

FIG. 19 - PRIOR ART
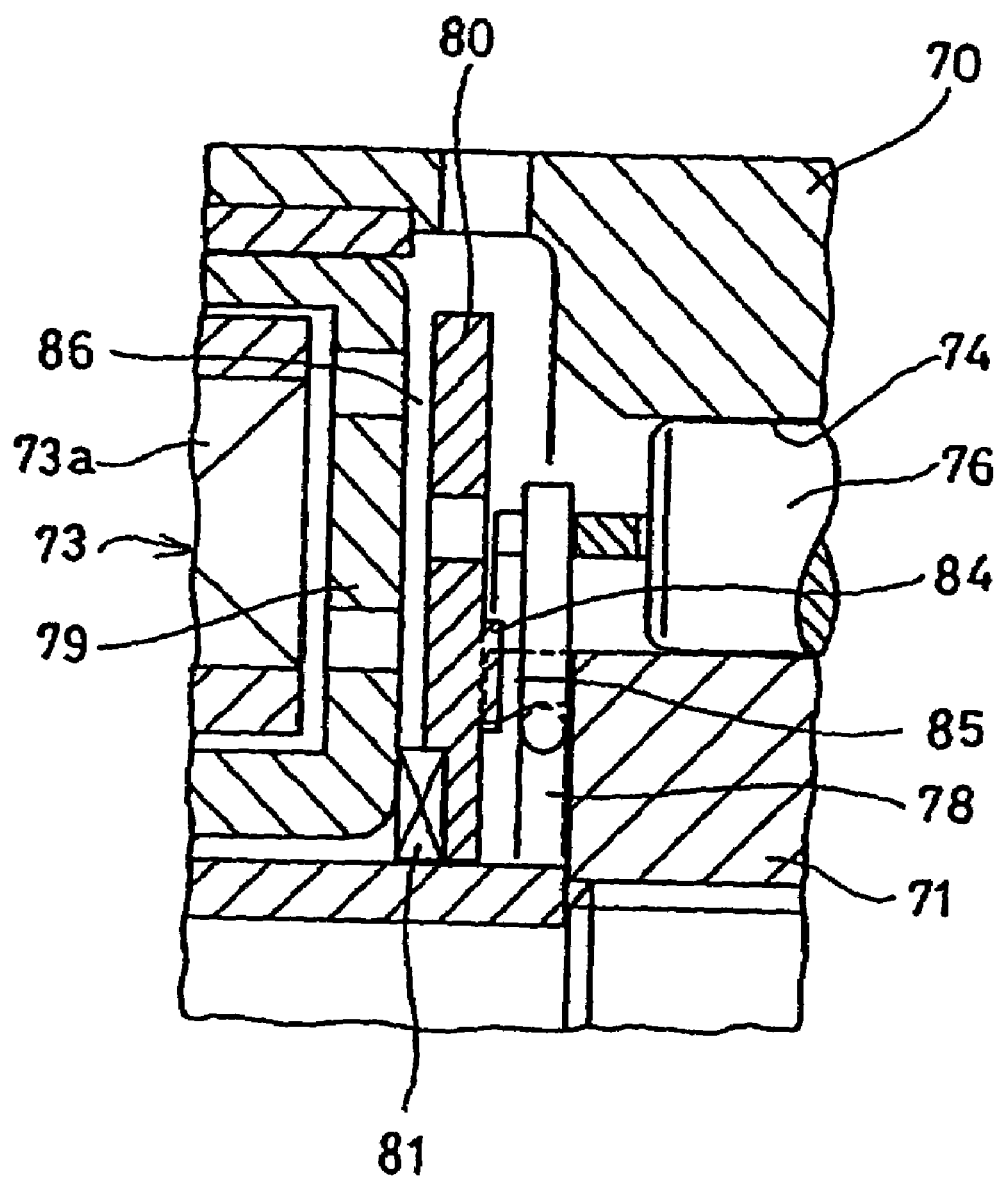

ROTATION TRANSMISSION DEVICE

This application is a divisional application of application Ser. No. 10/609,482, filed Dec. 16, 2003, now abandoned.

BACKGROUND OF THE INVENTION

This invention relates to a rotation transmission device mounted on a part-time four-wheel drive vehicle to selectively transmit the driving torque from the engine to the non-driven wheels during a two-wheel drive mode.

FIG. 18 shows a conventional such rotation transmission device to be mounted on a four-wheel drive vehicle of a front-engine rear-drive (FR) design to selectively transmit the driving torque from the engine to the front wheels.

This rotation transmission device comprises a two-way roller clutch 72 provided between an outer ring 70 and a cam ring 71 mounted in the outer ring 70 to selectively transmit the driving torque, and a solenoid 73 for controlling the engagement of the two-way clutch 72.

The two-way clutch 72 has rollers 76 as engaging elements mounted in a wedge space defined by a cylindrical surface 74 formed on the inner periphery of the outer ring 70 and a plurality of cam surfaces 75 formed on the outer periphery of the cam ring 71. The rollers 76 are retained by a retainer 77. A switch spring 78 is mounted between the retainer 77 and the cam ring 71 to bias the retainer 77 and thus the rollers 76 to a neutral position where the outer ring 70 and the cam ring 71 are not engaged by the rollers 76.

The solenoid 73 is mounted in a recess formed in one end of the outer ring 70. Mounted between the solenoid 73 and the retainer 77 are a rotor 79 which is made of a magnetic material and is nonrotatable relative to the outer ring 70, an armature 80 which is nonrotatable but axially movable relative to the retainer 77, and a spring 81 biasing the armature 80 axially away from the rotor 79.

This rotatation transmission device is mounted on a four-wheel drive vehicle of an FR design to selectively transmit the driving torque from the engine to its front wheels. For such an application, the cam ring 71 is nonrotatably mounted on the main shaft 82 for driving the front wheels with a rolling bearing 83 mounted between the rotor 79 and the main shaft 82 to rotatably support the rotor 79.

With the rotation transmission device mounted in this way, if one or both of the rear wheels begin to rotate faster than the front wheels, the coil 73a of the solenoid 73 is energized to attract the armature 80 to the rotor 79, thereby preventing the retainer 77 from rotating relative to the outer ring 70. The retainer 77 thus rotates relative to the cam ring 71 against the force of the switch spring 78. This causes the rollers 76 to get into the wedge spaces, thereby locking the outer ring 70 and the cam ring 71 together. Torque is thus transmitted from the cam ring 71 to the outer ring 70 and then to the front wheels. This means that the vehicle has been changed over from two-wheel drive to four-wheel drive mode.

When the coil 73a of the solenoid 73 is deactivated, the spring 81 moves the armature 80 away from the rotor 79. In this state, when the outer ring 70 begins to rotate faster than the cam ring 71, the switch spring 78 disengages the rollers 76, returns them to the neutral position and keeps them there. Torque is now not transmitted from the cam ring 71 to the outer ring 70. That is, the vehicle is now being driven only by the rear wheels in a two-wheel drive mode.

In the conventional rotation transmission device shown in FIG. 18, during such a two-wheel drive mode in which the outer ring 70 stops with the rollers 76 in a neutral position, if the rotating speed of the cam ring 71 increases to a high level, since the retainer 76 rotates with the cam ring 71, the rollers 76 will move radially outwardly under centrifugal force until they physically contact the cylindrical surface 74 of the outer ring 70. Thus the cam ring 71 will be exposed to a drag force. If this drag force becomes greater than the force of the switch spring 78, the retainer 77 will rotate relative to the cam ring 71 against the force of the switch spring 78 until the rollers 76 engage in the wedge spaces, thereby locking the rings 70 and 71 together and transmitting the torque of the cam ring 71 to the outer ring 70, in spite of the fact that the solenoid 73 is not on.

One way to prevent the two-way clutch from engaging while the solenoid 73 is off is, as shown in FIG. 19, to provide a protrusion 84 on the armature 80 so as to engage in a cutout 85 formed in the cam ring 71 and thereby to prevent the armature 80 and thus the retainer 77 from rotating relative to the cam ring 71 while the solenoid is off. But when the solenoid 73 is activated and the armature 80 is attracted to the rotor 79, it is necessary to move the armature 80 axially until the protrusion 84 completely gets out of the cutout 85. Thus, it is necessary to provide an axial gap 86 between the armature 80 and the rotor 79. In order to move the armature 89 axially by the distance equal to such a large axial gap, a large-capacity solenoid is needed.

Such a large axial gap will also pose another problem that it takes a rather long time after the coil 73a of the solenoid 73 is activated until the rollers 79 actually engage, so that the rotational speed difference between the outer ring 70 and the cam ring 71 tends to grow large. Thus, a large shock may be produced when the rollers 76 engage.

A first object of this invention is to provide a rotation transmission device of the above-described type having means for preventing the rollers from displacing by a drag force and engaging into the wedge spaces defined by the cylindrical surface and the cam surfaces when the cam ring is not engaged.

Another object is to provide this type of rotation transmission device which allows easy adjustment of the axial gap between the rotor and the armature.

In a conventional such rotation transmission device, even with outer rings having a complicated shape, a predetermined permissible surface pressure is required for the engaging surface with the engaging elements. Thus outer rings are heretofore formed by forging or cutting e.g. a carburized material.

But such a manufacturing method is poor in mass-productivity and high in the product cost.

A second object of the present invention is to provide an inexpensive outer ring for a rotation transmission device having a sufficient permissible surface pressure.

SUMMARY OF THE INVENTION

In order to solve the first problem, according to this invention, there is provided a rotation transmission device comprising a two-way clutch and a solenoid for controlling the engagement of the two-way clutch, the two-way roller clutch comprising an outer member, an inner member mounted in the outer member, the outer member having an inner cylindrical surface, the inner member having a plurality of flat cam surfaces on its outer periphery so as to be opposite to the cylindrical surface, thereby defining wedge spaces between the cylindrical surface and the cam surfaces, a plurality of rollers each mounted between the cylindrical surface and one of the cam surfaces, a retainer for retaining the rollers circumferentially separate from one another, a switch spring mounted between the retainer and the inner member for biasing the retainer toward a neutral position where the rollers are not engaged in the wedge spaces, a rotor mounted between the solenoid and the retainer so as to be nonrotatable relative to the outer ring, an armature mounted between the retainer and the rotor so as to be nonrotatable relative to the retainer and axially movable toward and away from the rotor, whereby the armature is attracted to the rotor when the solenoid is energized, and a spring mounted between the rotor and the armature for axially biasing the armature away from the rotor, the rotation transmission device further comprising an engaging plate mounted between the inner member and the armature so as to be nonrotatable relative to the inner member, rotatable relative to the rotor and axially immovable relative to the rotor, and an arrangement provided between the engaging plate and the armature for engaging the armature and the engaging plate together when the armature rotates in one direction by a predetermined angle relative to the engaging plate from a position where the rollers are in the neutral position, thereby preventing the armature from further turning relative to the engaging plate in the one direction.

With this arrangement, if the rollers are pressed against the outer ring due to increased centrifugal force and thus drag force is transmitted from the outer ring to the retainer, causing the inner member and the retainer to rotate relative to each other by a predetermined angle, a means for preventing relative rotation is activated to prevent the armature from turning further relative to the engaging plate. This prevents the engaging elements from engaging into the wedge spaces defined by the cylindrical surface and the cam surfaces.

The means comprises the protrusion formed on one of the opposed surfaces of the engaging plate and the armature and a hole formed in the other. The protrusion is formed with a tapered surface adapted to be pushed by an edge of the hole when the rotational speed difference between the inner member and the rotor decreases below a predetermined value, thereby allowing the protrusion to come out of the hole and thus pushing the armature toward the solenoid.

With this embodiment, with the engaging elements kept in their neutral position, the projection is displaced circumferentially from the hole and is retained in contact with the end face of the opposing member. Thus, the axial space defined between the opposed surfaces of the armature and rotor can be adjusted to a small value, irrespective of the axial dimension of the portion of the protrusion inserted into the hole. Thus, it is possible to use a small-capacity, small-sized solenoid to engage and disengage the two-way clutch.

Another advantage of such a protrusion and a hole is that the axial sleeve can be adjusted only by controlling the axial dimension of the rotor. Thus, it can be adjusted easily.

The rotor may be mounted in a tubular rotor guide pressed into the outer member. In this case, the engaging plate may be rotatably but axially immovably supported on the rotor guide. If the engaging plate is supported by the rotor guide, the axial gap between the rotor and the armature can be adjusted simply by adjusting the axial dimension of the rotor guide. Thus, the axial gap can be adjusted easily.

In order to solve the second problem, according to this invention, there is provided a rotation transmission device comprising an outer ring, an inner member and engaging elements mounted the said outer ring and the inner member, characterized in that a clutch outer ring formed of a material having a higher strength than the outer ring is inserted into the outer ring, and that the outer ring is formed of a casting.

In a rotation transmission device using a clutch outer ring, by forming the clutch outer ring from a high-strength material and forming the outer member from a casting, since the outer member can be formed of a casting, the product cost can be reduced significantly.

By pressing a sleeve formed of a material having a higher strength than the outer member onto an outer member formed of a casting, it is possible to increase the permissible surface pressure of the outer member. Thus, it is possible to reduce the thickness of the outer member.

The high-strength material for the clutch outer ring may be a heat-treated bearing steel, carburized steel or high-frequency steel.

BRIEF DESCRIPTION OF THE DRAWINGS

FIG. 18 is a vertical sectional front view of a conventional rotation transmission device; and FIG. 19 is a partial sectional view of a conventional rotation transmission device provided with a conventional means for preventing the rollers from engaging due to drag force.

DETAILED DESCRIPTION OF THE PREFERRED EMBODIMENTS

The embodiments of the present invention will be described with reference to FIGS. 1–17. FIGS. 1–7 show a rotation transmission device of the first embodiment.

Figure 1:
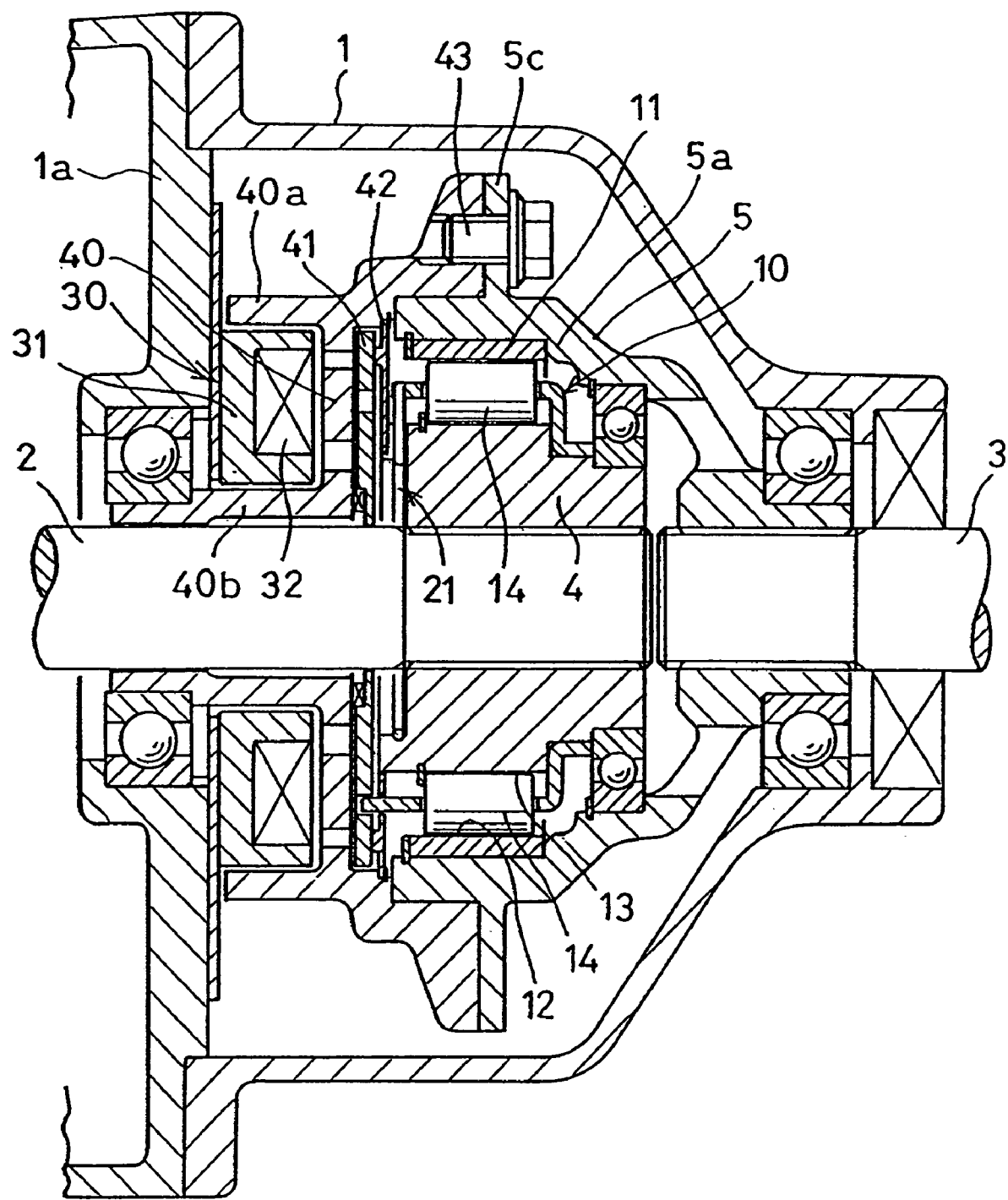
FIG. 1 is a vertical sectional front view of the rotation transmission device of a first embodiment according to the present invention.

Referring first to FIG. 1, the rotation transmission device is provided in a housing 1.

It includes an inner member or cam ring 4 mounted on one end of an input shaft 2 and an outer member or outer ring 5 provided around the cam ring 4 and coupled to an output shaft 3 which is provided coaxially with the input shaft 2.

Figure 2:
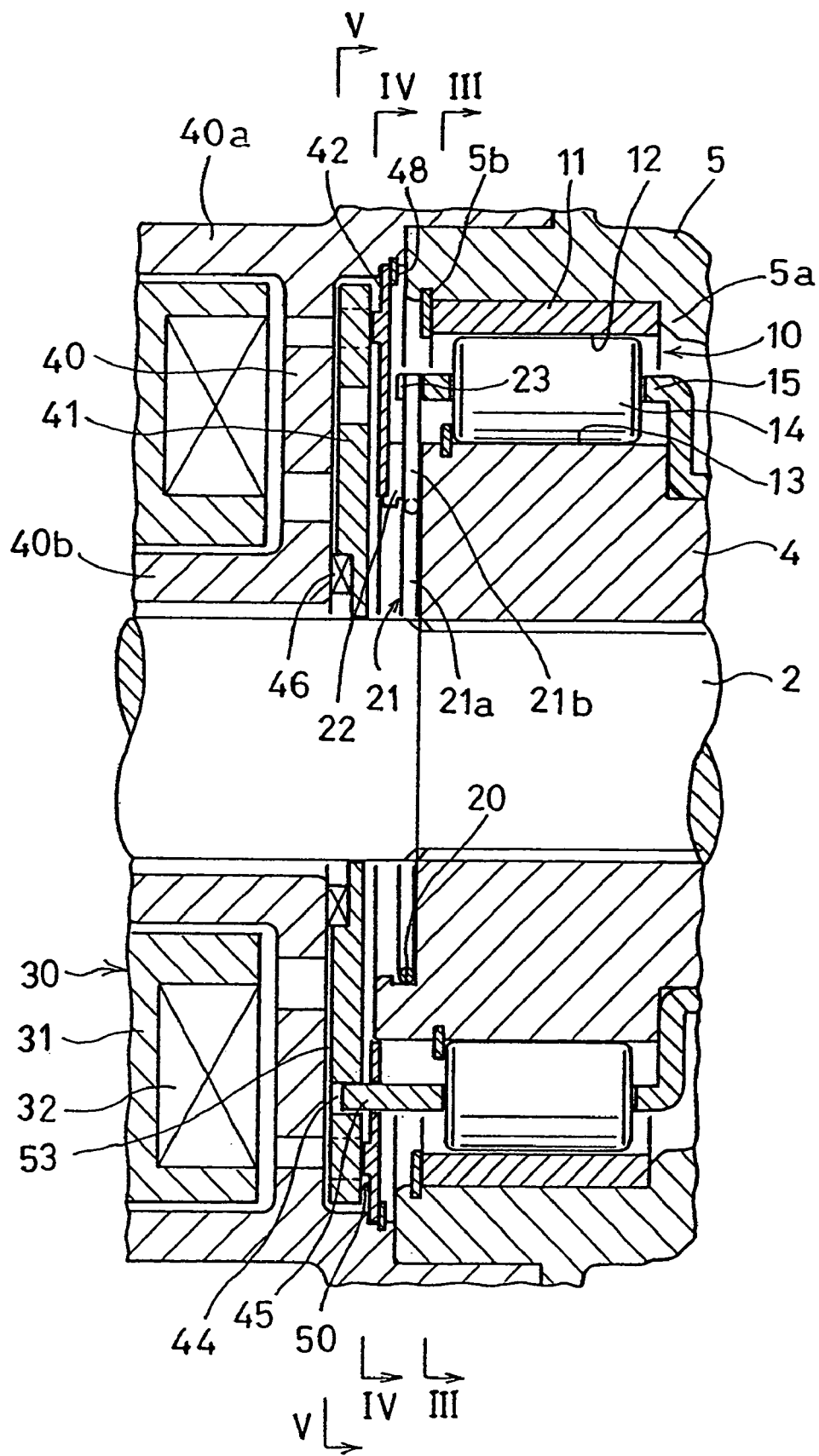
FIG. 2 is a partial sectional enlarged view of the same.

As more clearly shown in FIG. 2, the rotation transmission device further includes a roller type two-way clutch 10 mounted between the outer ring 5 and the cam ring 4. The two-way clutch 10 comprises a clutch outer ring 11 axially retained by snap ring 5b and a shoulder 5a formed on the inner surface of the outer ring 5 and formed with a cylindrical surface 12 on its inner periphery, engaging elements or rollers 14 each mounted in a wedge space defined by the cylindrical surface 12 and one of a plurality of flat cam surfaces 13 formed on the outer periphery of the cam ring 4, and a retainer 15 retaining the rollers 14.

The clutch outer ring 11 may be omitted. If omitted, the cylindrical surface is directly formed on the inner periphery of the outer ring 5.

Figure 3:
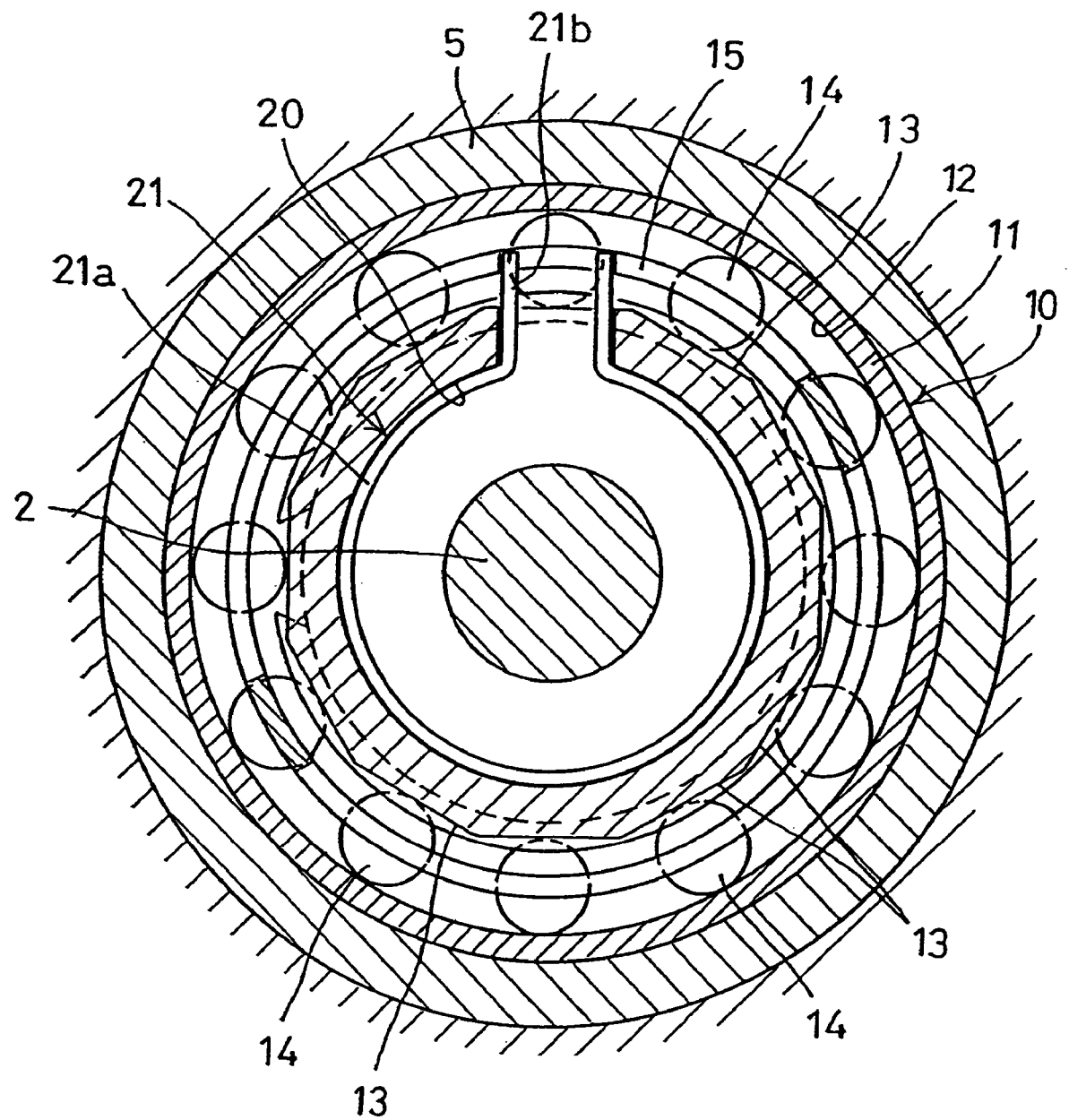
FIG. 3 is a sectional view along line III—III of FIG. 2.

As shown in FIGS. 2 and 3, a circular recess 20 is formed in an end face of the cam ring 4. A switch spring 21 has a ring portion 21a mounted in the recess 20 and its radially outwardly extending ends 21b extending through one of two radial grooves 22 formed in the radially outer wall of the recess 20 into a cutout 23 formed in one end of the retainer 15. The ends 21b of the switch spring 21 bias the retainer 15 relative to the cam ring 4 toward a position where the groove 22 radially aligns with the cutout 23. The rollers 14 are arranged such that when the groove 22 and the cutout 23 are radially aligned with each other, the rollers 14 are retained by the retainer 15 in a neutral position where they are not engaged in the wedge spaces.

Referring to FIGS. 1 and 2, axially opposite the two-way clutch 10, a solenoid 30 for controlling the two-way clutch 10 is mounted on the input shaft 2 and supported by a support wall 1a extending from the housing 1.

The solenoid 30 comprises a core 31 and a coil 32 wound around the core. Mounted between the solenoid 30 and the two-way clutch 10 are a rotor 40 made of a magnetic material, an armature 41 also made of a magnetic material, and an engaging plate 42.

The rotor 40 has an outer cylindrical sleeve 40a and an inner cylindrical sleeve 40b. The outer sleeve 40a is fixed to a flange 5c provided on the outer periphery of the outer ring 5 by bolts 43 while the inner sleeve 40b is mounted on the input shaft 2 so as to be rotatable.

Figure 5:
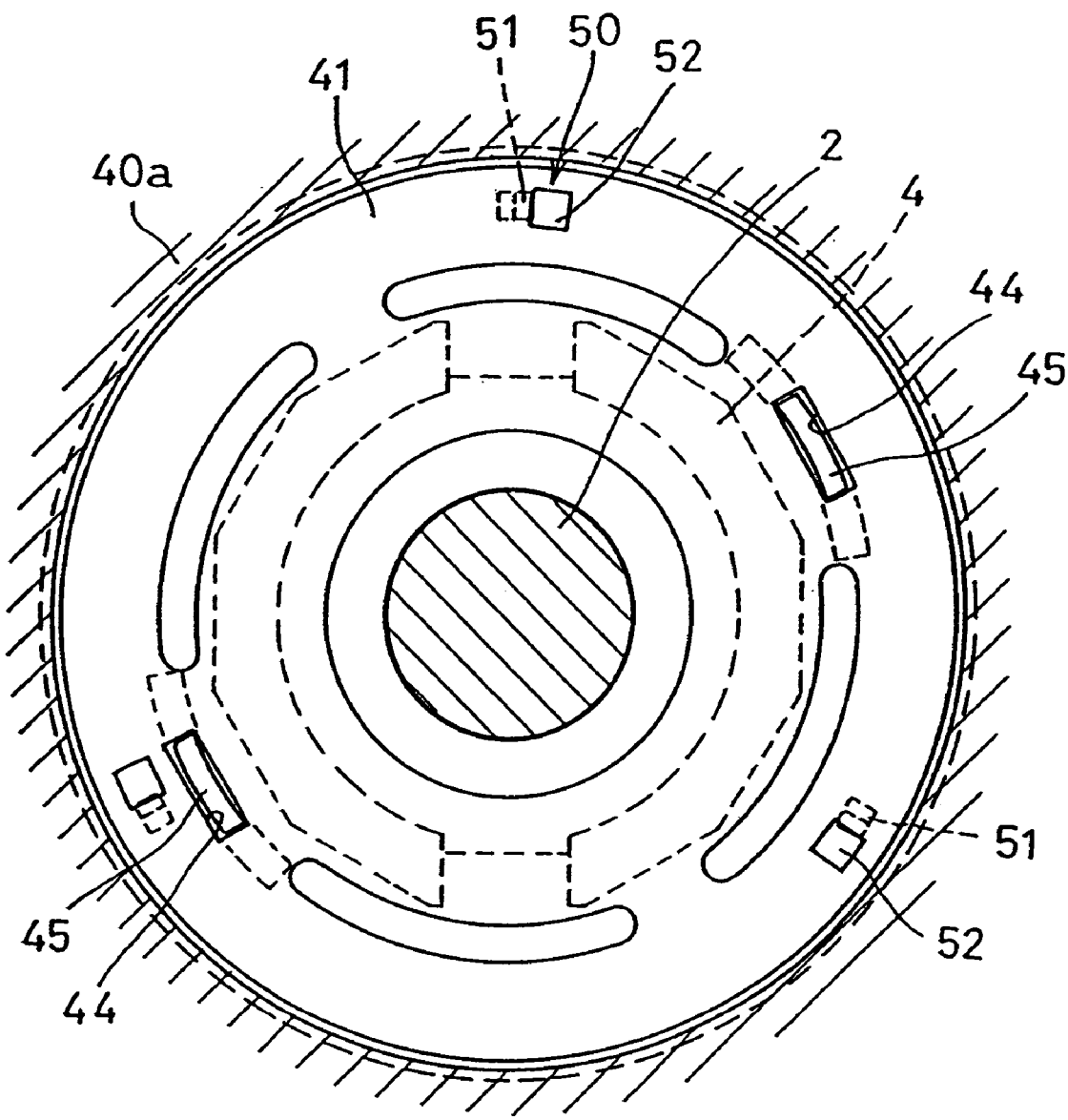
FIG. 5 is a sectional view along line V—V of FIG. 2.

As shown in FIGS. 2 and 5, the armature 41 has a plurality of holes 44 in which are inserted protrusions 45 provided on the end of the retainer 15 to keep the armature 41 non-rotatable relative to the retainer 15 but axially movable.

The armature 41 is axially biased away from the rotor 40 by a spring 46 mounted between the armature 41 and the rotor 40.

Figure 4:
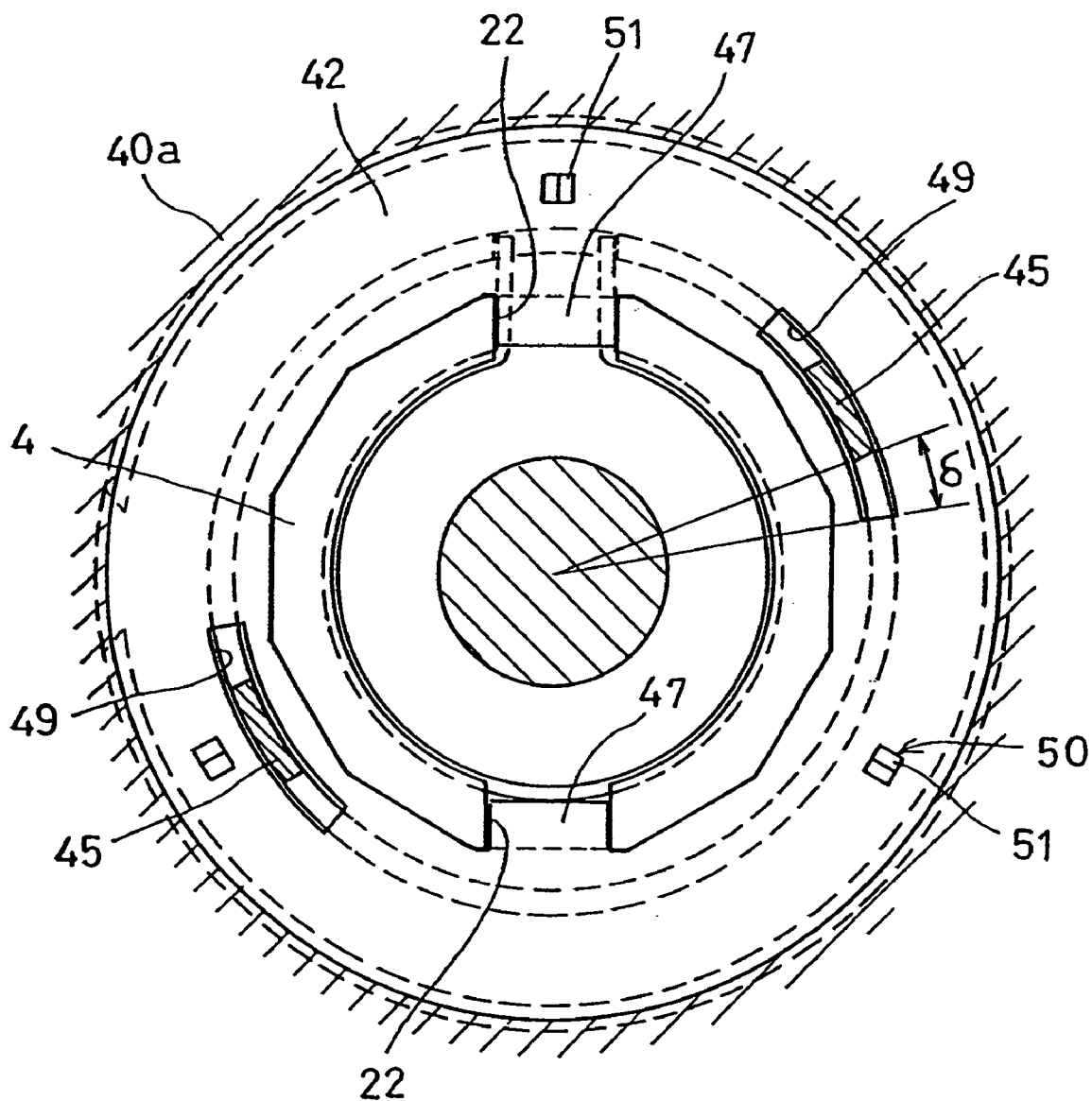
FIG. 4 is a sectional view along line IV—IV of FIG. 2.

As shown in FIGS. 2 and 4, the engaging plate 42 is an annular member having protrusions 47 protruding radially inwardly from its inner edge. The protrusions 47 are inserted in the grooves 22 formed in the cam ring 4, thereby preventing the engaging plate 42 from turning relative to the cam ring 4. The engaging plate 42 is inserted in the outer sleeve 40a of the rotor 40 so as to be rotatable relative to the rotor 40. The axial movement of the engaging plate 42 is however prevented by a snap ring 48 fitted in the outer sleeve 40a.

The protrusions 45 formed on the end of the retainer 15 extend through slits 49 formed in the engaging plate 42 into the holes 44 of the armature 41. Play δ is formed between both ends of the slit 49 and the protrusions 45 in the circumferential direction so that the armature 41 and the engaging plate 42 can turn relative to each other by the amount of the play δ.

Provided between the engaging plate 42 and the armature 41 is a means 50 for locking the engaging plate 42 and the armature 41 together when these members 41 and 42 turn by a predetermined angle relative to each other, thereby preventing them from turning relative to each other.

Figure 6A:
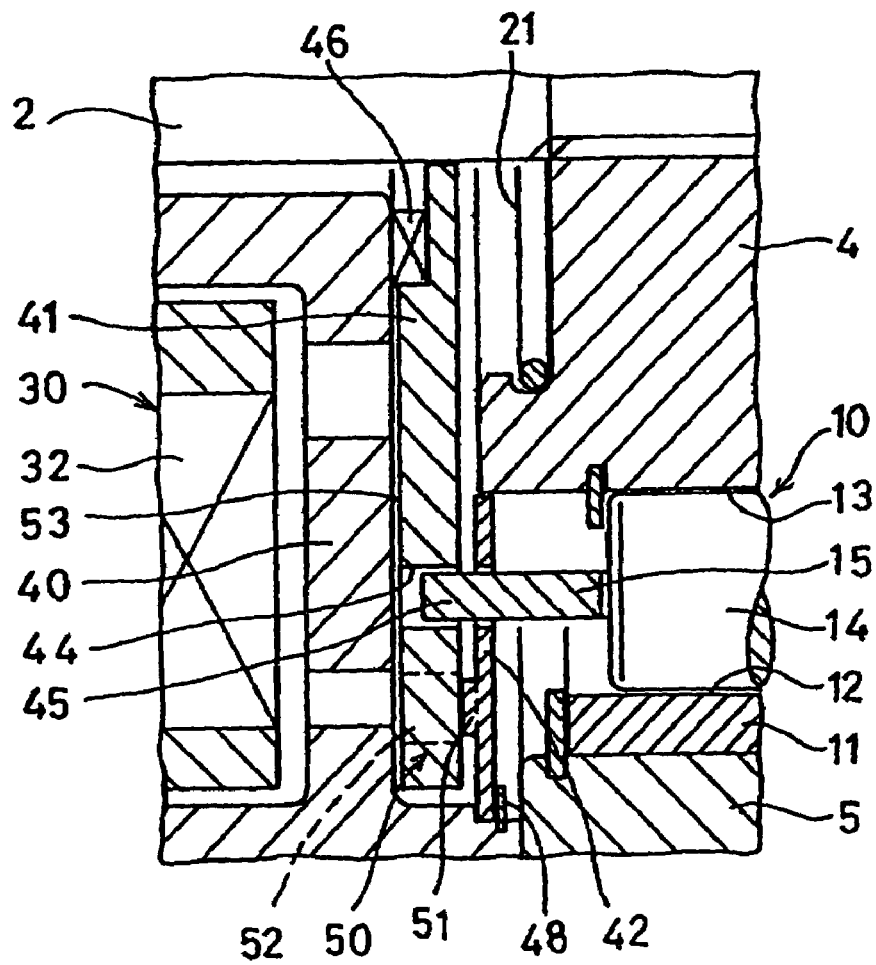
FIG. 6A is an enlarged sectional view of the rotation transmission device of FIG. 1, showing the means for preventing relative rotation of the engaging plate and the armature.
Figure 6B:
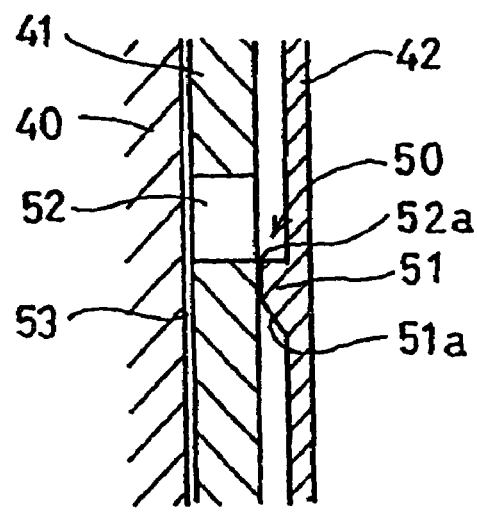
FIG. 6B is a sectional plan view of the means.

As shown in FIGS. 6A and 6B, this means 50 comprises a protrusion 51 formed on one side of the engaging plate 42 that faces the armature 41, and a hole 52 formed in the armature 41.

The protrusion 51 and the hole 52 are arranged so as to be circumferentially displaced from each other when the rollers 14 of the two-way clutch 10 are retained in the neutral position, and axially align with each other when the armature 41 and the engaging plate 42 turn relative to each other by a predetermined angle in a first direction. When the protrusion 51 and the hole 52 axially align with each other, the armature 41 is axially moved toward the engaging plate 42 by the spring 46 until the protrusion 51 engages in the hole 52. Thus, the armature 41 and the engaging plate 42, and thus the cam ring 4 and the retainer 15 are prevented from turning relative to each other any further.

The phase gap between the projection 51 and the hole 52 with the rollers 14 retained in the neutral position is smaller than the angle required for the rollers 14 to move from the neutral position to a position where they engage the cylindrical surface 12 and the cam surface 13, so that with the projection 51 in the hole 52 the rollers 14 will not engage the cylindrical surface 12 or the cam surface 13.

The protrusion 51 has a tapered surface 51a on the rear end surface with respect to the first direction. Thus, with the protrusion 51 engaged in the hole 52, when the drag force applied from the outer ring to the rollers 14 decreases below the force of the switch spring 21, the armature 41 begins to turn relative to the engaging plate 42 in the second direction that is opposite to the first direction and the protrusion 51 is allowed to come out of the hole 52 under the force of the switch spring 21 due to the provision of the tapered surface 51a.

The projection 51 may be provided on the armature 41 and the engaging plate 42 may be formed with a hole. In this case, the tapered surface 51a is formed on the other end of the projection 51.

With the rotation transmission device of the first embodiment, when the input shaft 2 is turned with the rollers 14 of the two-way clutch 10 in the neutral position, the cam ring 4 is also turned. The rotation of the cam ring 4 is transmitted through the switch spring 21 to the retainer 15. The rollers 14 are thus kept in the neutral position, so that the torque will not be transmitted to the outer ring 5.

When the coil 32 of the solenoid 30 is activated with the input shaft 2 rotating, the armature 41 is attracted to the rotor 40. Thus, the armature 41 rotates together with the rotor 40.

Since the protrusion 45, which is engaged in the hole 44, keeps the retainer 15 nonrotatable relative to the armature 41, the retainer 15 also rotates together with the rotor 50 in this state. Thus, the rotating speed of the retainer 15 drops relative to the cam ring 4, so that the rollers 14 move until they engage in the wedge spaces defined by the cylindrical surface 12 and the cam surfaces 13. The two-way clutch 10 thus engages.

Torque from the cam ring 4 is thus transmitted through the two-way clutch 10 to the outer ring 5, so that the output shaft 3 will rotate.

When the cam ring 4 and the retainer 15 rotate relative to each other, the switch spring 21 will deform elastically and the restoring elasticity gives a turning force to return the retainer 15 to its neutral position.

Once the two-way clutch 10 engages, the solenoid coil 32 is deactivated.

While the torque from the input shaft 2 is being transmitted through the two-way clutch 10 to the output shaft 3, when the rotating speed of the output shaft 3 exceeds that of the input shaft 2, the retainer 15 will be turned toward its neutral position by the switch spring 21, so that the rollers 14 disengage. Torque is thus not transmitted from the input shaft 2 to the output shaft 3.

While the input shaft 2 is rotating at a relatively low speed with the two-way clutch 10 disengaged, the cam ring 4 and the retainer 15 are rotating at the same low speed as the input shaft. In this state, centrifugal force acting on the rollers 14 is also correspondingly small, so that the contact pressure, if any, between the cylindrical surface 12 of the clutch outer ring 11 and the rollers 14 is also small. The drag force applied to the retainer 15 is thus smaller than the force of the switch spring 21. The spring 21 is thus not deformed.

Thus, in this state, the rollers 14 are kept in the neutral position and the armature 41, which rotates together with the retainer 15, and the engaging plate 42, which rotates together with the cam ring 4, will rotate with the protrusion 51 and the hole 52 circumferentially displaced from each other, as shown in FIGS. 6A and 6B.

When the cam ring 4 is rotated at a higher speed with the outer ring 5 at a stop, the centrifugal force acting on the rollers 14 increases, thus pressing the rollers 14 hard against the cylindrical surface 12. Thus the drag force acting on the retainer 15 increases. If this drag force exceeds the force of the switch spring 21, the rotating speed of the armature 41, which is coupled to the retainer so as to rotate together with the retainer, falls below the rotating speed of the engaging plate 42, which is nonrotatably coupled to the cam ring 4.

Figure 7A:
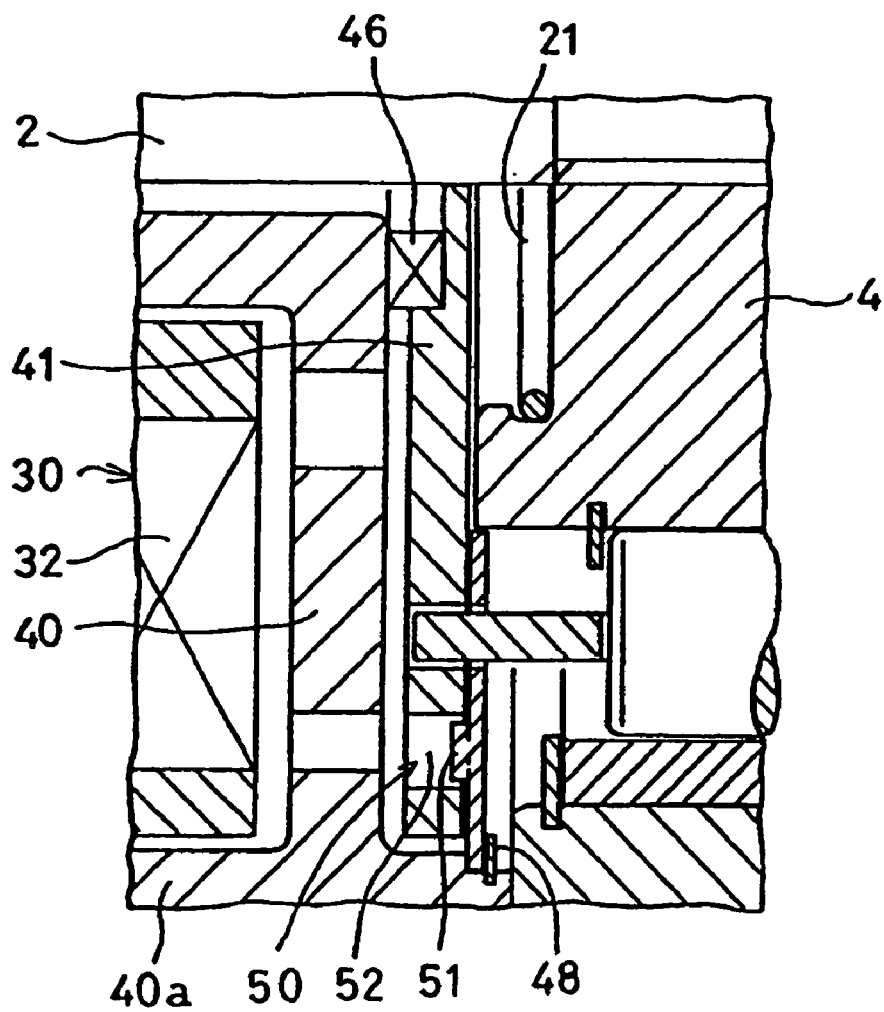
FIG. 7A is a sectional view similar to FIG. 6A but showing a different operational state.
Figure 7B:
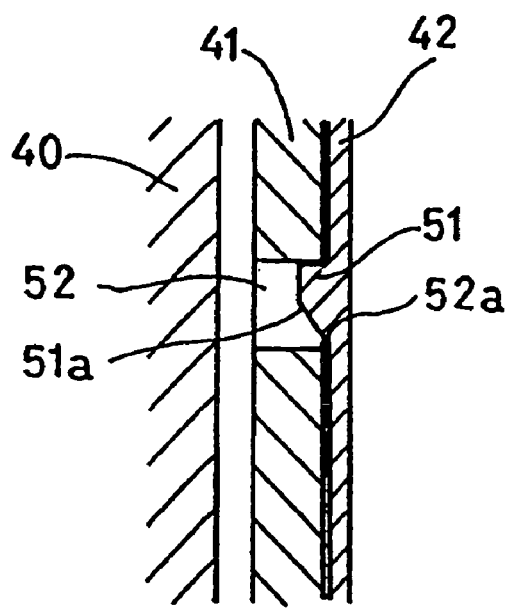
FIG. 7B is a sectional plan view of FIG. 7A.

When the engaging plate 42 rotates relative to the armature 41 until the protrusion 51 axially aligns with the hole 52, the spring 46 axially moves the armature 41 toward the engaging plate 42 until the protrusion 51 engages in the hole 52 as shown in FIGS. 7A and 7B, thereby preventing the armature 41 from further turning relative to the retainer 15. The retainer 15 and the cam ring 4 rotate together.

In this state, the rollers 14 will not engage in the wedge spaces defined by the cylindrical surface 12 and the cam surfaces 13, keeping the disengaged state even if the drag force is large.

As shown in FIGS. 7A and 7B, when the rotating speed of the cam ring falls to a certain level with the protrusion 51 engaged in the hole 52, the armature 41 begins to turn relative to the cam ring 4 under the combined force of the force of the switch spring and the inertia acting on the armature 41. Thus, the tapered surface 51a of the protrusion 51 is pushed by the edge 52a of the hole 52 to push the protrusion 51 out of the hole 52, thereby pushing the armature 41 away from the engaging plate 42. Then, the retainer is further turned by the switch spring 21 until the rollers 14 return to the neutral position where the protrusion 51 is circumferentially displaced from the hole 52 as shown in FIG. 6A.

In the state of FIG. 6A, the axial gap 53 between the rotor 40 and the armature 41 is small. Thus, the armature 41 can be reliably attracted to the rotor 40 by energizing the coil 32 of the solenoid 30.

The axial gap 53 can be set to a small value irrespective of the engaging depth of the projection 51 in the hole 52. Because the projection 51 and the hole 52 have no effect on the engagement of the two-way clutch 10, a small solenoid 30 having a small capacity can be used to control the engagement of the two-way clutch 10.

By providing the projection 51 on the engaging plate 42 and forming the hole 52 in the armature 41, the size of the axial gap 53 can be adjusted by changing only the axial dimension of the rotor 40 without the need to adjust the axial dimensions of other parts, including the cam ring 4. The size of the axial gap can thus be adjusted very easily.

Figure 8:
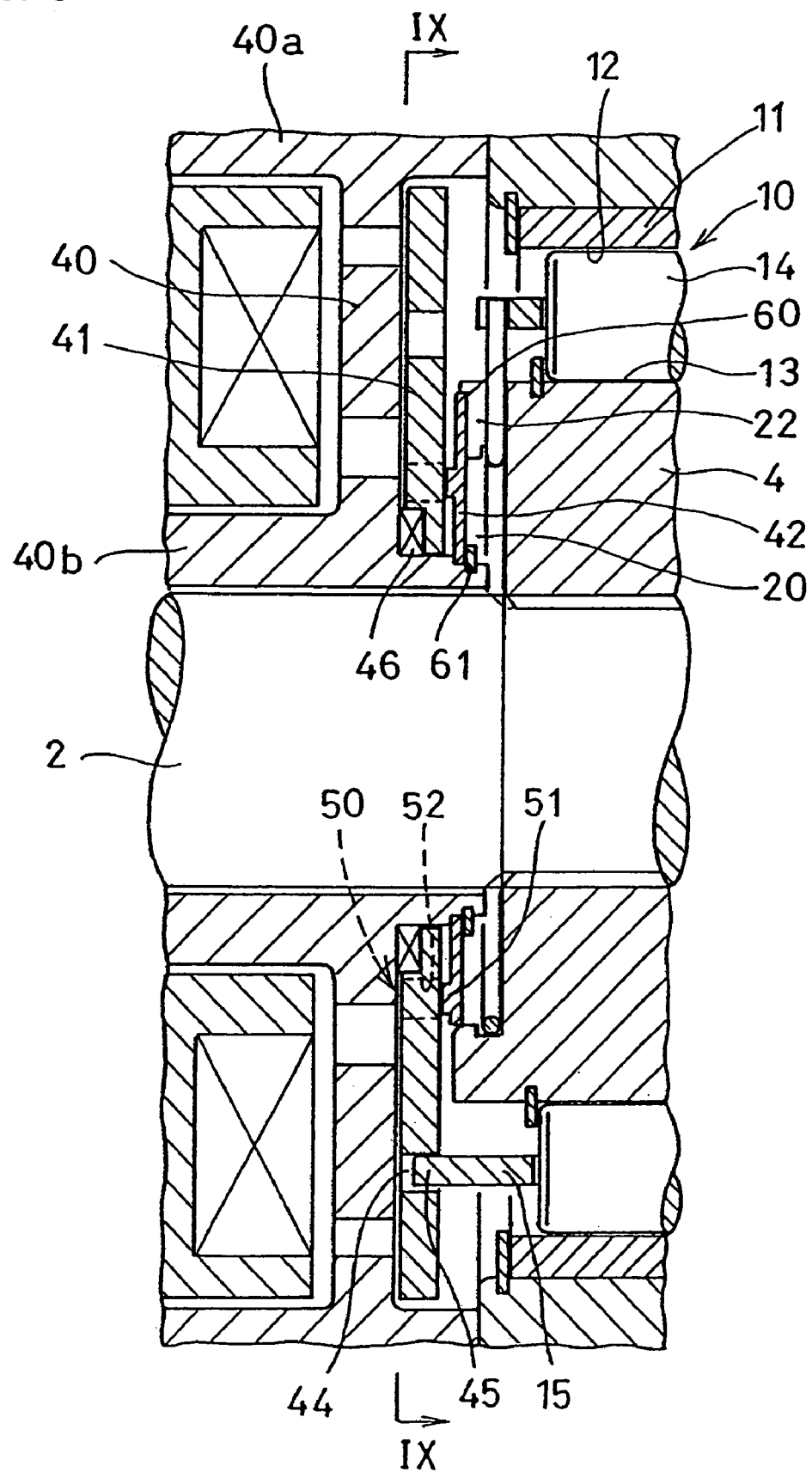
FIG. 8 is a sectional view of the rotation transmission device of a second embodiment.
Figure 9:
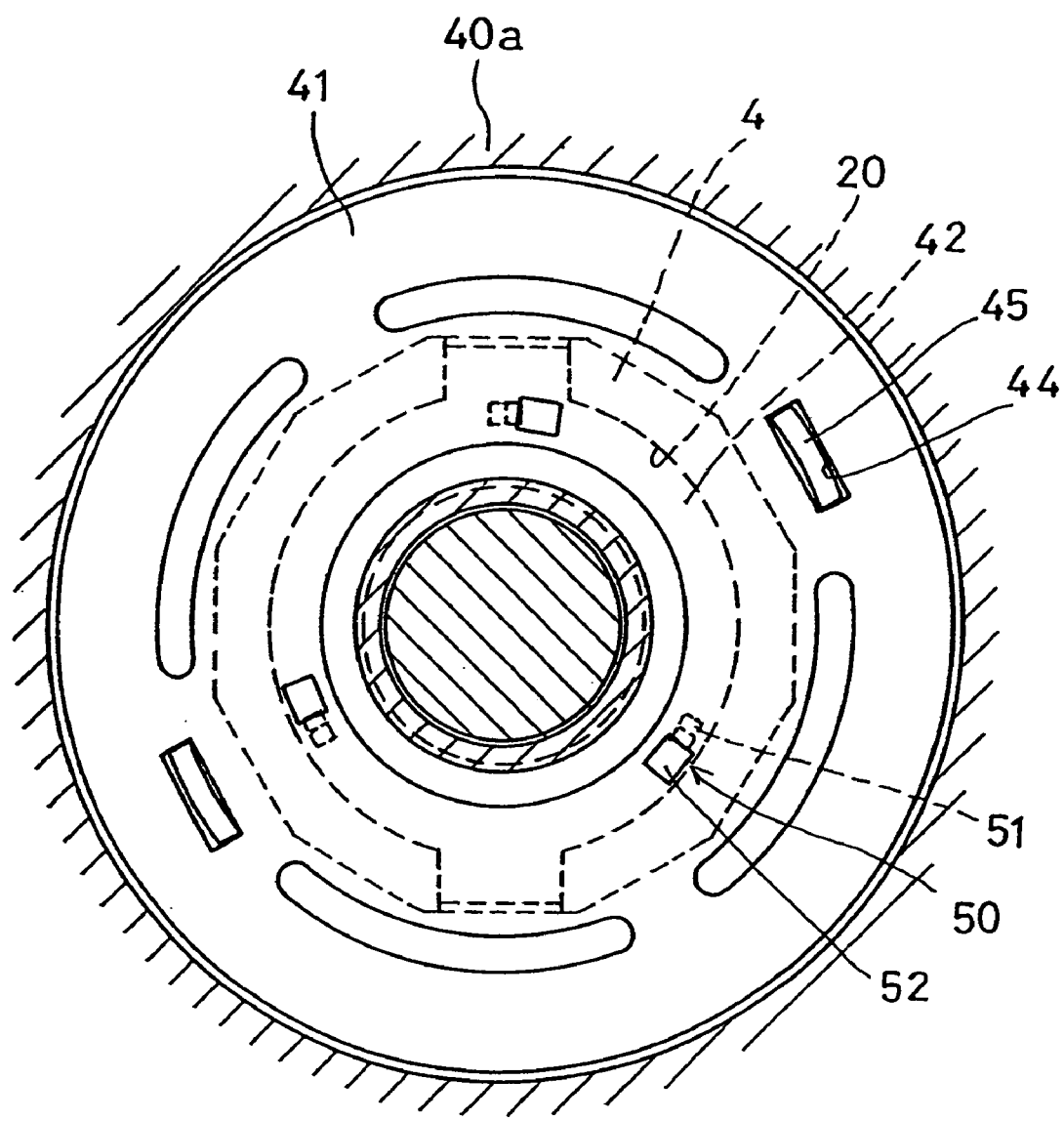
FIG. 9 is a sectional view along line IX—IX of FIG. 8.

FIGS. 8–9 show a rotation transmission device of the second embodiment. In this embodiment, the engaging plate 42 is received in a circular recess 20 formed in the end face of the cam ring 4 and has protrusions 60 along its outer edge so as to be received in the grooves 22 formed in the end face of the cam ring 4. The engaging plate 42 is rotatably received in the inner sleeve 40b of the rotor 40. Its axial movement is prevented by a snap ring 61.

Otherwise, this embodiment is the same as the first embodiment.

Like elements are denoted by like numerals, and their description is omitted. In operation, too, this embodiment is the same as the first embodiment.

The engaging plate 42 of the second embodiment is small enough in diameter to be received in the circular recess 20 formed in the cam ring 4. Thus, it is lighter in weight than the engaging plate of the first embodiment. Also, there is no need to form the slits 49 of the first embodiment through which the protrusions 45 of the retainer 15 are inserted. The engaging plate of the second embodiment is thus easier to manufacture than that of the first embodiment.

Figure 10:
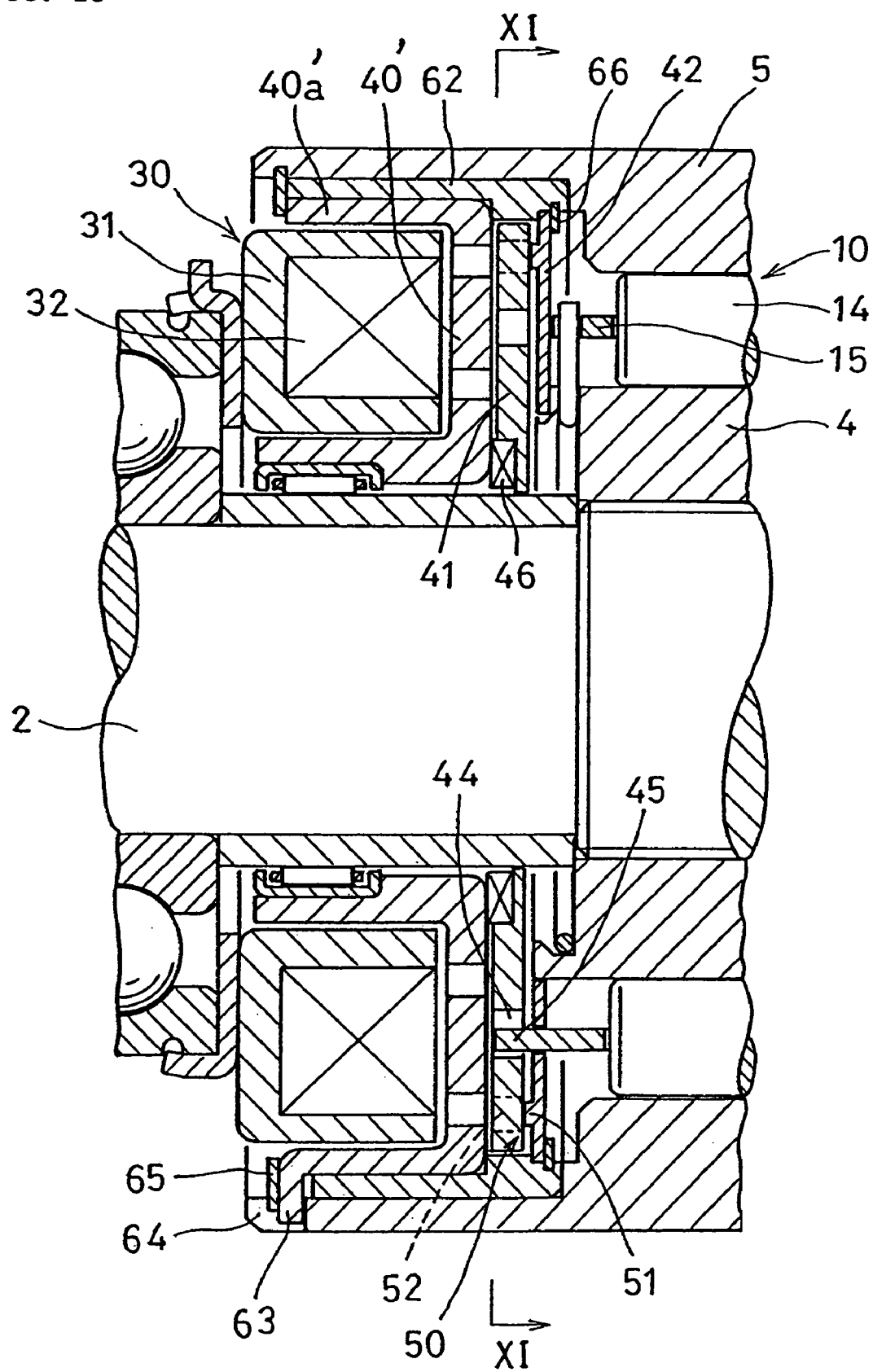
FIG. 10 is a sectional view of the rotation transmission device of a third embodiment.
Figure 11:
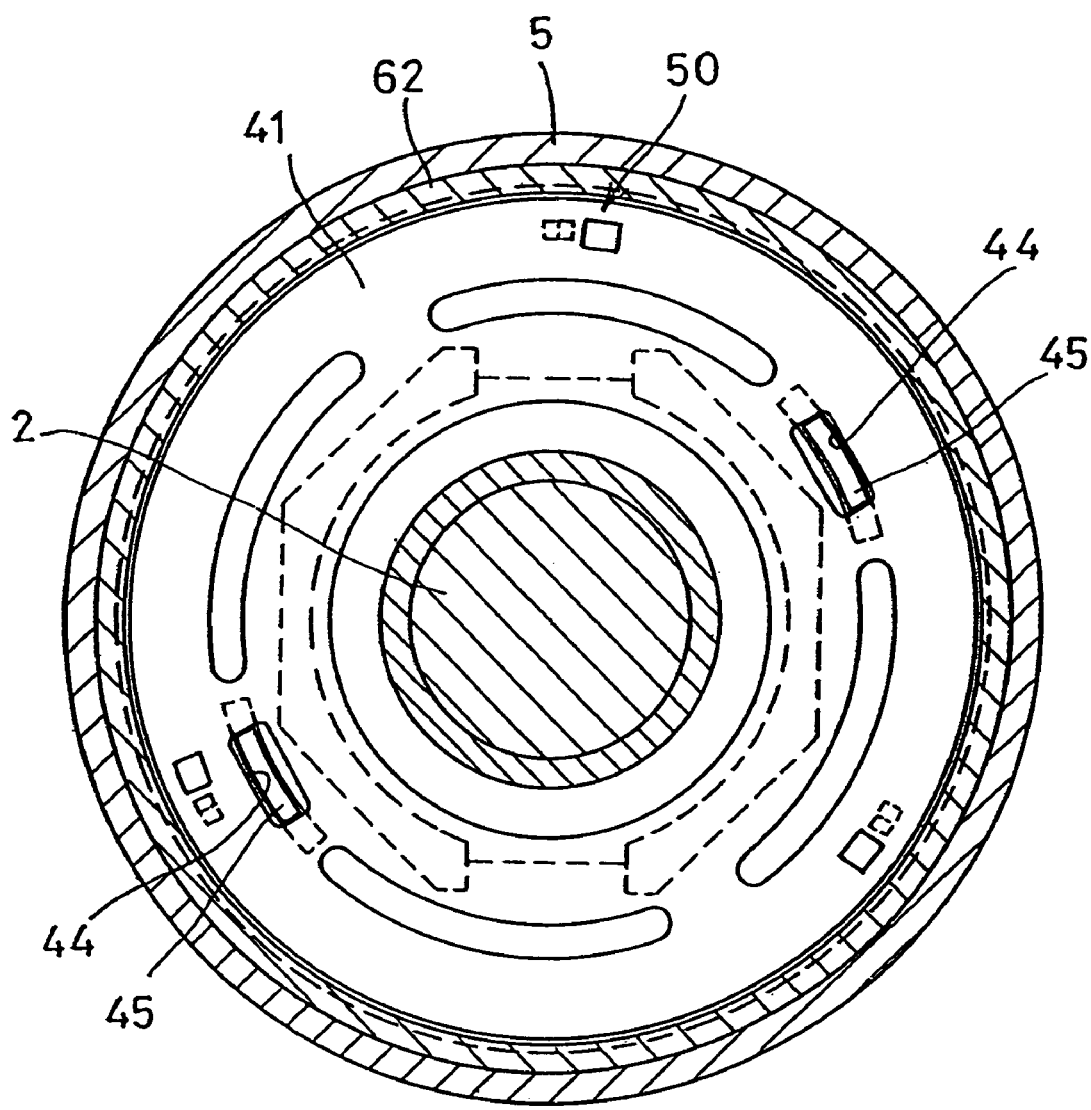
FIG. 11 is a sectional view along line XI—XI of FIG. 10.
Figure 12:
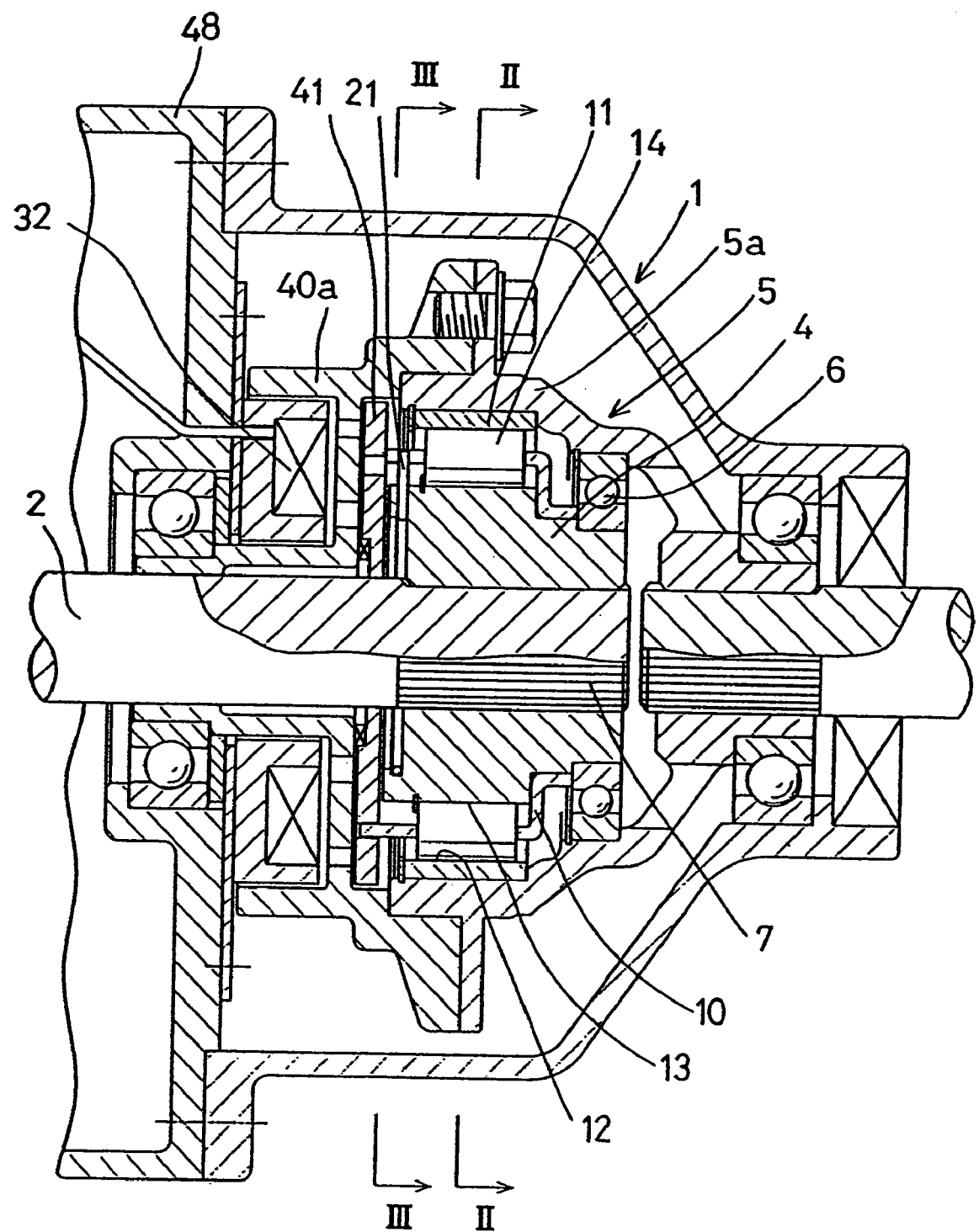
FIG. 12 is a sectional view of the rotation transmission device of a fourth embodiment.
Figure 13:
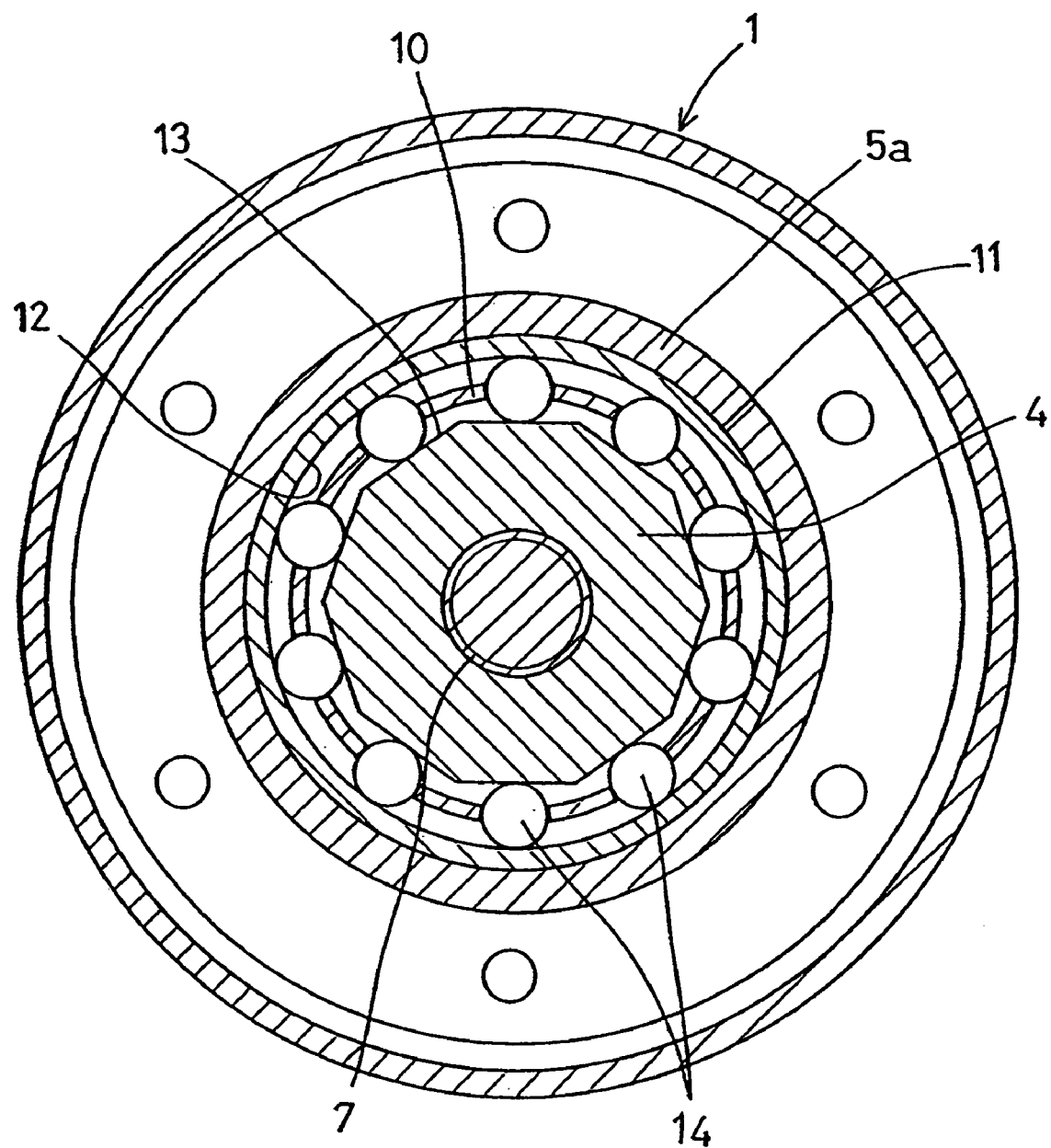
FIG. 13 is a vertical sectional view along line II—II of FIG. 12.
Figure 14:
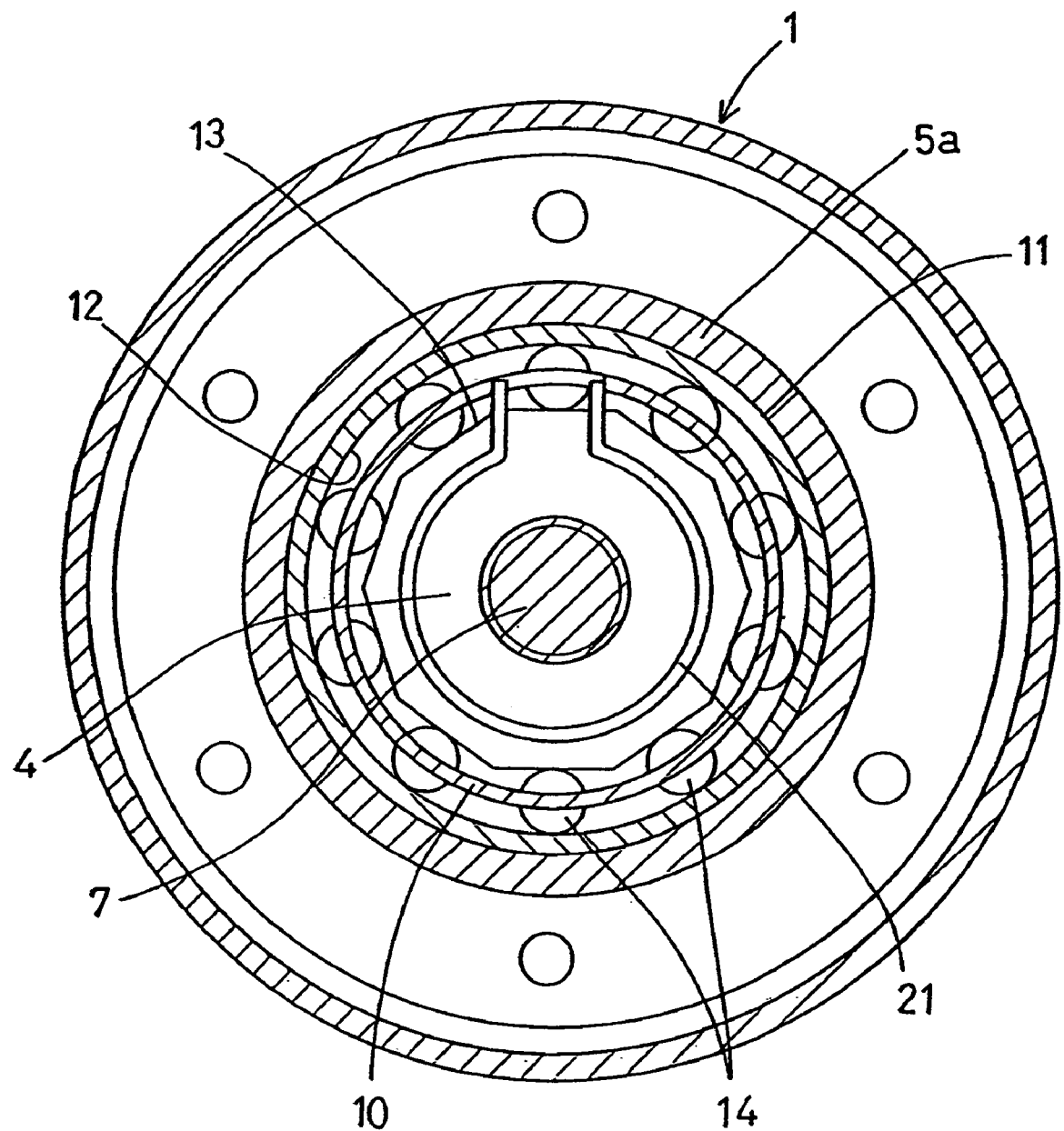
FIG. 14 is a vertical sectional view along line III—III of FIG. 12.
Figure 15:
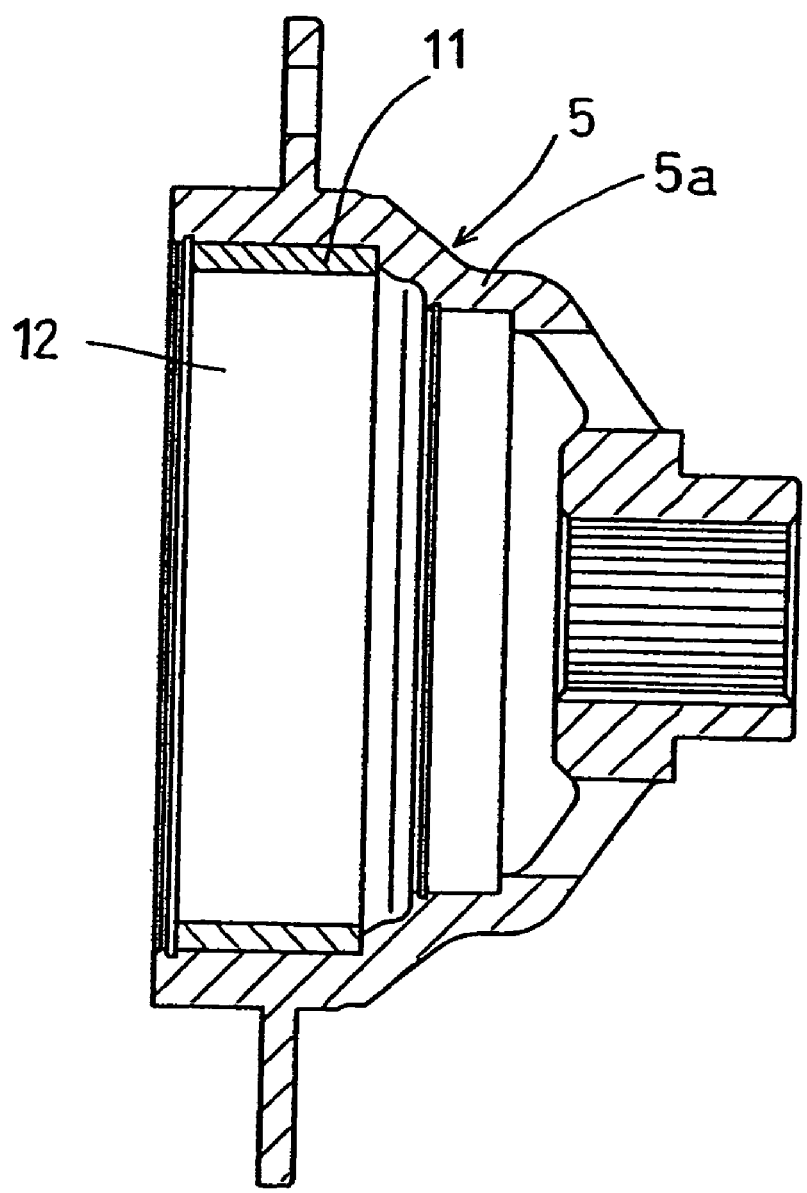
FIG. 15 is a vertical sectional front view showing an outer ring of the fourth embodiment.

FIGS. 10 and 11 shows the third embodiment. In this embodiment, a cylindrical rotor guide 62 is inserted into the outer ring 5 from one end thereof. An outer cylindrical sleeve 40a' of a rotor 40' is inserted into the rotor guide 62. The outer sleeve 40a' has radially outwardly extending protrusions 63 at its open end. The protrusions 63 are engaged in cutouts 64 formed in the ends of the rotor guide 62 and the outer ring 5 to keep the rotor 40' and the rotor guide 62 nonrotatable relative to the outer ring 5. Further, a snap ring 65 is fitted in the outer ring 5 from its open end to prevent the rotor 40' and the rotor guide 62 from coming out of the outer ring 5. The engaging plate 42 is rotatably received in the rotor guide 62. The axial movement of the engaging plate 42 is prevented by a snap ring 66. Otherwise, this embodiment is structurally the same as the first embodiment.

Like members are thus denoted by like numerals. In operation, too, this embodiment is the same as the first embodiment.

In the third embodiment, since the rotor guide 62 is mounted in the outer ring 5 and the rotor 40' is supported by the rotor guide 62, which is made of a nonmagnetic material, it is possible to use a solenoid that is smaller in outer diameter than the solenoid of the first embodiment.

FIGS. 12–15 show the fourth embodiment of the rotation transmission device according to this invention.

To the tip of an input shaft 2 of this rotation transmission device, an inner member 4 is coaxially and nonrotatably fixed through serrations 7.

On the outer surface of the inner member 4, which is nonrotatably fixed to the input shaft 2, a housing 1 is mounted which has a tubular outer ring 5 which is provided opposite the outer peripheral surface of the inner member 4 through a bearing 6.

A plurality of cam surfaces 13 are formed on the outer peripheral surface of the inner member 4 while the inner peripheral surface of the outer ring 5 is formed with a cylindrical surface 12 to define a wedge space between each cam surface 13 and the cylindrical surface 12. In the wedge spaces, a retainer 15 is mounted around the inner member 4.

Rollers 14 as engaging elements are mounted in pockets formed in the retainer 15 corresponding to the cam surfaces 13.

When the rollers 14 are in their neutral or central position relative to the respective cam surfaces 13, a gap is formed between each roller and the cylindrical surface 12, so that the clutch is off and, therefore, rotation of the inner member 4 is not transmitted to the outer ring 5. When the rollers 14 are moved to one side of the wedge spaces by the retainer 15, they will wedge into between the cam surfaces 13 and the cylindrical surface 12. The clutch is now turned on, so that the rotation of the inner member 4 is transmitted to the outer ring 5.

A switch spring 21 has one end thereof engaging the retainer 15 and its other end engaging the inner member 4. Thus the switch spring 21 biasses the retainer 15 to its neutral position where the rollers 14 are not in engagement with the cam surfaces 13 or the cylindrical surface 12.

The two-way clutch provided between the input shaft 2 and the outer ring 5 is turned on and off by an electromagnetic clutch.

The electromagnetic clutch has an electromagnetic coil 32 nonrotatably fixed to a case 48 e.g. by bolts and having its electrodes passed through the case and connected to an external controller (ECU). The controller selectively activates and deactivates the two-way clutch by controlling the current supplied to the electromagnetic coil 32 based on front and rear wheel speed signals, signals from a mode select switch, ABS ON/OFF signals, etc.

A rotor 40 provided so as to be rotatable relative to the electromagnetic coil 32 is fixed to the outer ring 5 so as to rotate together with it to serve as a friction flange. An armature 41 coupled to the retainer 15 so as to be axially slidable but nonrotatable relative to it is arranged so as to overlap the rotor 40 through a suitable gap. Thus, when the electromagnetic coil 32 is activated, the rotor 40 and the armature 41 are pressed against each other by a magnetic force, thereby fixing the outer ring 5 and the retainer 15 together in the rotational direction.

The outer ring 5 as the outer member is wholly formed of a casting material. A clutch outer ring 11 is inserted at its portion on which the surface pressure of the rollers 14 acts, and the cylindrical surface 12 is formed on the inner surface of the clutch outer ring 11.

The clutch outer ring 11 of any of the embodiments is made of a high-strength material such as bearing steel, carburized steel or induction-hardened steel.

By forming only the portion on which the surface pressure is applied from the rollers from a high-strength material, the outer ring 5 itself cam be formed by casting.

Figure 16:
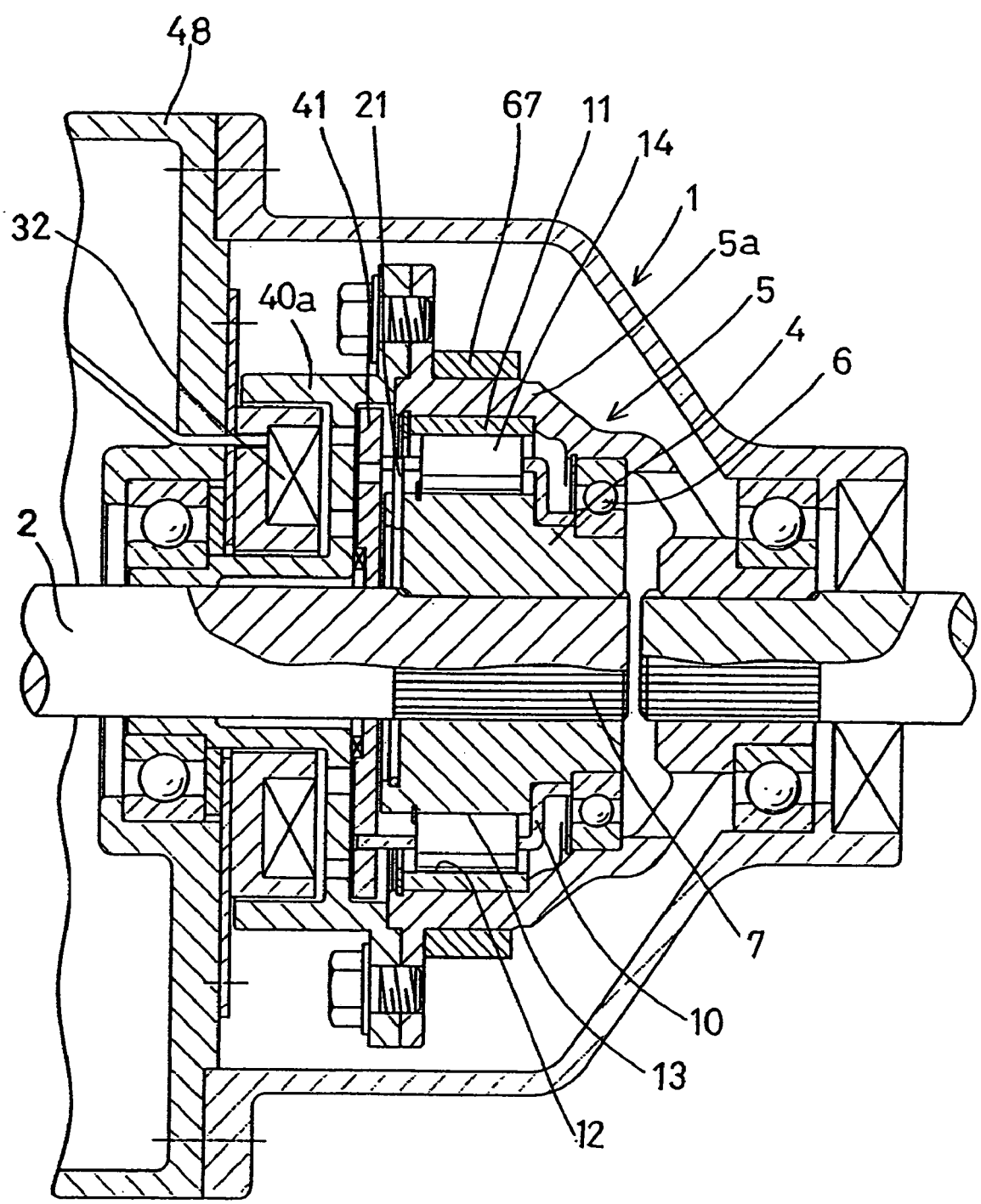
FIG. 16 is a sectional view showing a fifth embodiment of the rotation transmission device according to this invention.
Figure 17:
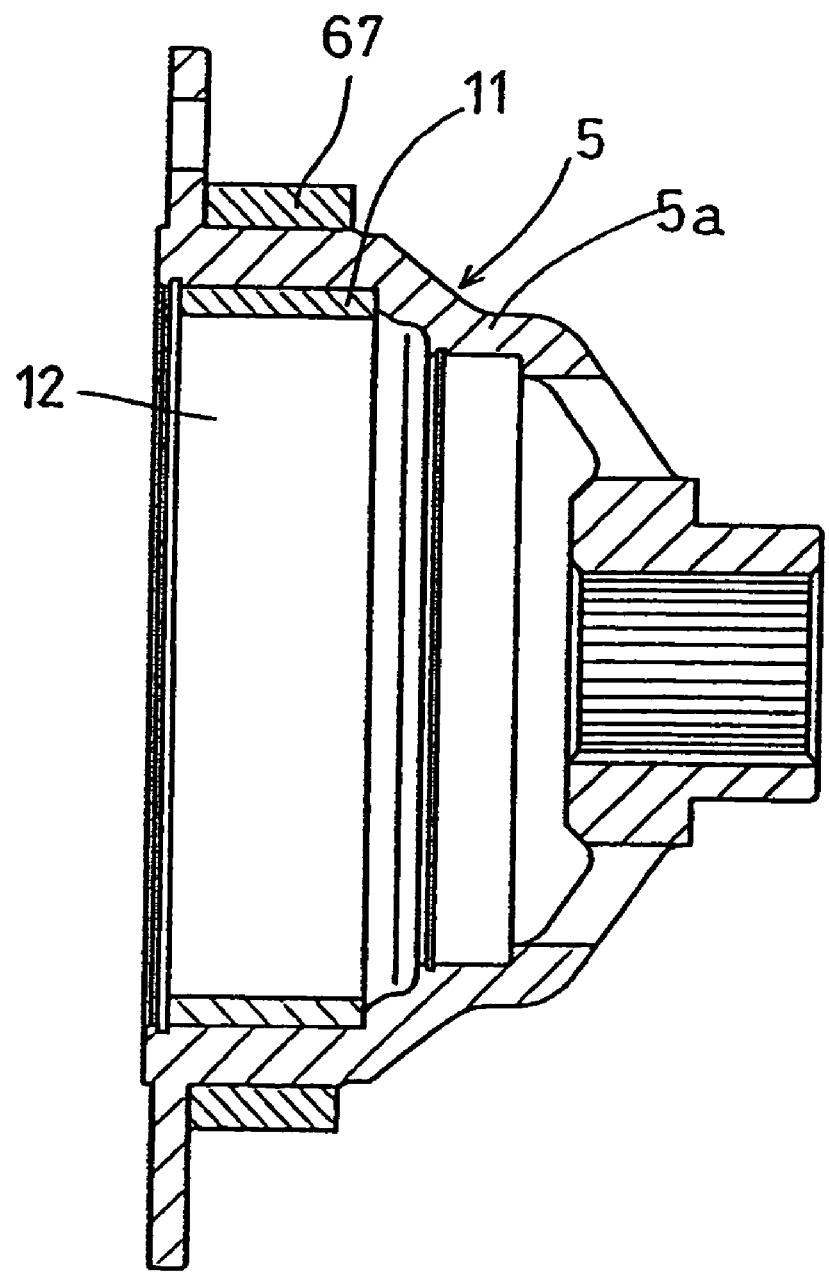
FIG. 17 is a vertical sectional front view showing an outer ring of the fifth embodiment.

Next, FIG. 16 shows the fifth embodiment of the rotation transmission device according to this invention.

If the outer ring 5 is formed of a casting, even if the clutch outer ring 11 formed of a high-strength material is inserted into the outer ring 5, unless the external size of the outer ring 5 is increased, it is impossible to increase the permissible surface pressure.

Thus in the fifth embodiment, the clutch outer ring 11 formed of a material having a higher strength than the outer ring 5 is inserted into the outer ring 5, and further an outer sleeve 67 formed of a material having a higher strength than the outer ring 5 is fitted on the outer ring 5 to increase the strength of its portion on which the surface pressure acts. Thus, it is possible to reduce the thickness of the outer ring 5.

With the arrangement of this invention, if the rollers are pressed against the outer ring due to increased centrifugal force and thus drag force acts on the retainer, causing the inner member and the retainer to rotate relative to each other, the means for preventing relative rotation is activated to prevent the armature from turning further relative to the inner member. This prevents the engaging elements from engaging into the wedge spaces defined by the cylindrical surface and the cam surfaces.

This means comprises the protrusion formed on one of the opposed surfaces of the engaging plate and the armature and a hole formed in the other. The protrusion and the hole are arranged such that when the inner member rotates by a predetermined angle relative to the armature, the protrusion engages in the hole, thus preventing the armature from turning any further relative to the inner member. Thus, the axial space defined between the opposed surfaces of the armature and the rotor can be adjusted to a small value irrespective of the axial dimension of the portion of the protrusion inserted into the hole. Thus it is possible to use a small-capacity, small-sized solenoid to engage and disengage the two-way clutch.

Another advantage of such a protrusion and a hole is that the axial space or gap can be adjusted only by changing the axial dimension of the rotor or the rotor guide. Thus it can be adjusted easily.

Also, by pressing a sleeve made of a high-strength material in the outer member, it becomes possible to make the outer member by casting. This considerably decreases the manufacturing cost.

What is claimed is:

1. A rotation transmission device comprising a two-way roller clutch and a solenoid for controlling the engagement of said two-way roller clutch, said two-way roller clutch comprising an outer member, an inner member mounted in said outer member, said outer member having an inner cylindrical surface, said inner member having a plurality of flat cam surfaces on its outer periphery so as to be opposite to said inner cylindrical surface, thereby defining wedge spaces between said inner cylindrical surface and said cam surfaces, a plurality of rollers each mounted between said inner cylindrical surface and one of said cam surfaces, a retainer for retaining said rollers circumferentially separate from one another, a switch spring mounted between said retainer and said inner member for biasing said retainer toward a neutral position where said rollers are not engaged in said wedge spaces, a rotor mounted between said solenoid and said retainer so as to be nonrotatable relative to said outer ring, an armature mounted between said retainer and said rotor so as to be nonrotatable relative to said retainer and axially movable toward and away from said rotor, whereby said armature is attracted to said rotor when said solenoid is energized, and a spring mounted between said rotor and said armature for axially biasing said armature away from said rotor, said rotation transmission device further comprising an engaging plate mounted between said inner member and said armature so as to be nonrotatable relative to said inner member, rotatable relative to said rotor and axially immovable relative to said rotor, and an arrangement provided between said engaging plate and said armature for engaging said armature and said engaging plate together when said armature rotates in one direction by a predetermined angle relative to said engaging plate from a position where said rollers are in said neutral position, thereby preventing said armature from further turning relative to said engaging plate in said one direction.

2. The rotation transmission device of claim 1 wherein said arrangement comprises a protrusion formed on one of opposed surfaces of said armature and said engaging plate, and a hole formed in the other, said protrusion is formed with a tapered surface adapted to be pushed by an edge of said hole when the rotational speed difference between said inner member and said rotor decreases below a predetermined value, thereby allowing said protrusion to come out of said hole and thus pushing said armature toward said solenoid.

3. A rotation transmission device comprising a two-way roller clutch and a solenoid for controlling the engagement of said two-way roller clutch, said two-way roller clutch comprising an outer member, an inner member mounted in said outer member, said outer member having an inner cylindrical surface, said inner member having a plurality of flat cam surfaces on its outer periphery so as to be opposite to said inner cylindrical surface, thereby defining wedge spaces between said inner cylindrical surface and said cam surfaces, a plurality of rollers each mounted between said inner cylindrical surface and one of said cam surfaces, a retainer for retaining said rollers circumferentially separate from one another, a switch spring mounted between said retainer and said inner member for biasing said retainer toward a neutral position where said rollers are not engaged in said wedge spaces, a rotor guide mounted in said outer member and made of a nonmagnetizable material, a rotor mounted in said rotor guide and disposed between said solenoid and said retainer so as to be nonrotatable relative to said outer ring, an armature mounted between said retainer and said rotor so as to be nonrotatable relative to said retainer and axially movable toward and away from said rotor, whereby said armature is attracted to said rotor when said solenoid is energized, and a spring mounted between said rotor and said armature for axially biasing said armature away from said rotor, said rotation transmission device further comprising an engaging plate mounted between said inner member and said armature so as to be nonrotatable relative to said inner member, rotatable relative to said rotor guide and axially immovable relative to said rotor guide, and an arrangement provided between said engaging plate and said armature for engaging said armature and said engaging plate together when said armature rotates in one direction by a predetermined angle relative to said engaging plate from the position where said rollers are in said neutral position, thereby preventing said armature from further turning relative to said engaging plate in said one direction.

* * * * *

UNITED STATES PATENT AND TRADEMARK OFFICE
CERTIFICATE OF CORRECTION

| | |
|---|---|
| PATENT NO. | : 7,063,194 B2 |
| APPLICATION NO. | : 11/174653 |
| DATED | : June 20, 2006 |
| INVENTOR(S) | : Isao Hori et al. |

It is certified that error appears in the above-identified patent and that said Letters Patent is hereby corrected as shown below:

On the Title Page

In item (62), Related U.S. Application Data
Please replace "Dec. 16, 2003" with --July 1, 2003--.

In the Specification

In column 1, line 4, please replace "Dec. 16, 2003" with --July 1, 2003--.

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,063,194 B2
APPLICATION NO. : 11/174653
DATED : June 20, 2006
INVENTOR(S) : Isao Hori et al.

It is certified that error appears in the above-identified patent and that said Letters Patent is hereby corrected as shown below:

On the Title Page

In item (62), Related U.S. Application Data

Please replace "Dec. 16, 2003" with --July 1, 2003--.

In the Specification

In column 1, line 4, please replace "Dec. 16, 2003" with --July 1, 2003 --.

Signed and Sealed this

Twentieth Day of March, 2007

JON W. DUDAS
*Director of the United States Patent and Trademark Office*